May 25, 1954
C. H. VIEBROCK ET AL
2,679,436
VEHICLE PLATFORM
Filed Aug. 9, 1951
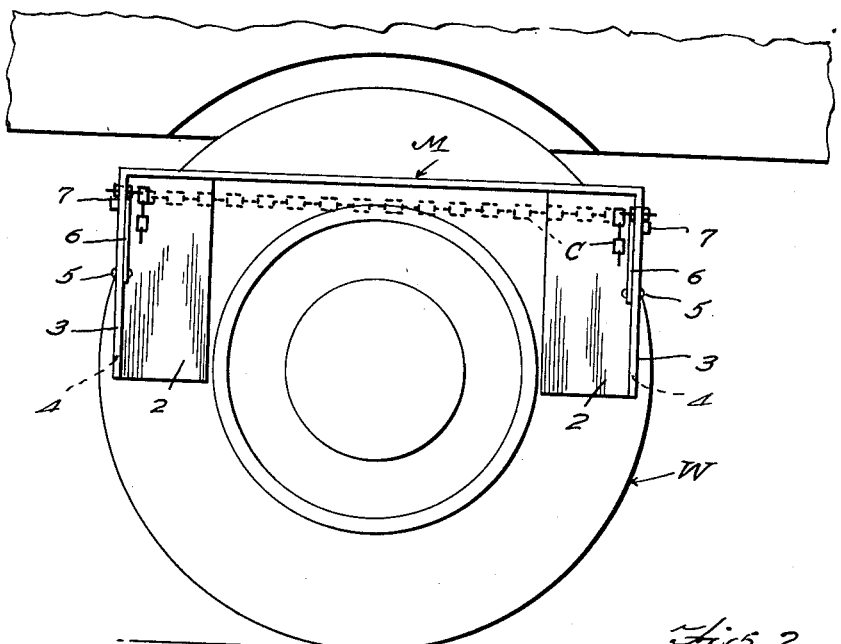
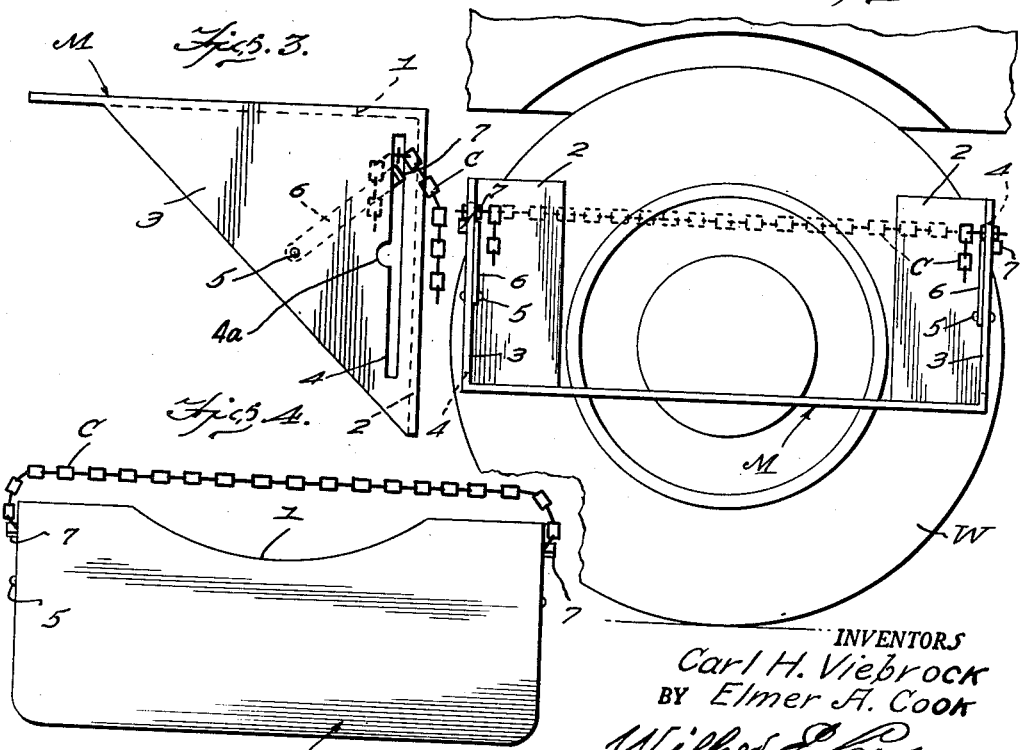
INVENTORS
Carl H. Viebrock
BY Elmer A. Cook
Wilfred E. Lawson
ATTORNEY Patented May 25, 1954

2,679,436

UNITED STATES PATENT OFFICE 2,679,436

VEHICLE PLATFORM

Carl H. Viebrock and Elmer A. Cook,
Douglas, Wash.

Application August 9, 1951, Serial No. 241,002

4 Claims. (Cl. 304—15)

This invention relates to a vehicle platform and it is an object of the invention to provide a device of this kind adapted to be supported upon a wheel of the vehicle.

It is also an object of the invention to provide a device of this kind including means wherein a platform comprised therein may be employed to equal advantage with either the upper or lower portion of the wheel.

The invention consists in the details of construction and in the combination and arrangement of the several parts of my improved vehicle platform whereby certain advantages are attained, as will be hereinafter more fully set forth.

In order that my invention may be better understood, I will now proceed to describe the same with reference to the accompanying drawings, wherein:

Figure 1 is a view in elevation illustrating a platform embodying the invention in applied position, the associated view being shown in fragment;

Figure 2 is a view similar to Figure 1 but showing the platform in a second position;

Figure 3 is a view in side elevation of the platform unapplied; and

Figure 4 is a view in top plan of Figure 3.

In the embodiment of the invention as illustrated in the accompanying drawings, M denotes an elongated flat and substantially rigid member rectangular in plan. This member may be of metal or such other material desired. This member M preferably is of a length not less than the diameter of a wheel W of a vehicle and the central inner longitudinal marginal portion of the member M is cut-out or recessed, as at 1, sufficient to allow the placement of the member M without hindrance or obstruction being given by the hub portion of the wheel W as the cut out or recess 1 is of a length and depth to bridge such hub portion.

Rigid with and depending from the inner longitudinal marginal portion of the member outwardly of and immediately adjacent to the cut out or recess 1 is a flat and broad back panel 2 of material length. As herein shown the outer side margin of the panel 2 is flush with the adjacent end of the member M.

Rigid with the edge end marginal portion of the member M and the outer side marginal portion of the adjacent back panel 2, is an end panel 3 which provides an effective bracing medium for the member M when the device is in use. This end panel 3 is in the form of an inverted right triangle and one margin extends a material distance across the member M while the perpendicularly related margin is co-extensive in length with the outer side margin of the associated panel 2.

Each of the end panels 3 is provided with an elongate slot 4 closely adjacent to the back of the panel 3 and substantially in parallelism therewith. In communication with the central portion of the slot 4 is an entrance recess 4a to allow an end portion of a chain C to be passed through the panel 3 for interlocking engagement with a marginal portion of said slot.

In practice, the member M is placed against the upper portion of the wheel W, and the chain C disposed across the rear portion of the wheel W. The extremities of the chain are previously interlocked with the end panels 3 through the slots 4. The adjustment of either or both end extremities of the chain C allows the member M to be readily held in desired position against the wheel W.

When the member is placed at the top portion of the wheel W the end portions of the chain will be at the ends of the slots 4 nearest to the member M. When it is desired to support the member at a lower part of the wheel W, the member M is placed in position with the back panels upwardly disposed. The extremities of the chain C interlocked with the end panels 3 will be at the ends of the slots 4 remote from the member M, and the slots 4 are of such length as to assure the ready and effective engagement of the intermediate portion of the chain across the upper rear portion of the wheel.

Each of the end panels 3 has pivotally engaged, as at 5, with the inner face thereof, an end portion of a resilient arm or lever 6. The opposite or free end portion of the arm or lever 6 is provided with an outwardly directed lip 7 to facilitate the desired swinging movement of the arm or lever 6 and this lip is slipped out of the slot to permit the lever to be swung from one end of the slot to the other when the chain is to be shifted. This arm or lever 6 is of a length to engage the chain C at either end of a slot 4 and hold the same in such position and against sliding along the slot 4. This is of especial advantage when applying the member M to the wheel W.

From the foregoing description it is thought to be obvious that a vehicle platform constructed in accordance with my invention is particularly well adapted for use by reason of the convenience and facility with which it may be assembled and operated.

I claim:

1. A platform to be applied to and supported by a wheel of a vehicle, comprising an elongate flat member to extend chordally across the outer side of the wheel, right angled bracing elements extending from the opposite ends and inner side edges of the member with the portions thereof at the inner side edges disposed in contact with the outer side of the wheel, the end portions of said bracing elements having slots extending vertically of the same, and a chain having its extremities extending through the slots from the outer sides of the bracing elements, the slots being of a width less than the width of the chain links to effect interlocking connection with the bracing elements, the intermediate portion of the chain engaging about the periphery and across the inner face of the wheel, said slots allowing the member to be applied to the wheel with the bracing elements disposed either upwardly or downwardly as may be required to place the member in a desired position of use.

2. The invention as set forth in claim 1, with means for releasably holding the extremities of the chain at either of the end portions of the slots.

3. The invention as set forth in claim 1, with means carried by the bracing elements and adapted for removable engagement in the slots to releasably hold the extremities of the chain at either of the end portions of the slots.

4. The invention as set forth in claim 1, with movable arms pivoted to the inner sides of the end portions of the bracing elements, each arm having a lateral lip adapted to extend into the adjacent slot for holding engagement with a chain end when the free ends of the chains are positioned in either of the extremities of the slot.

References Cited in the file of this patent

UNITED STATES PATENTS

| Number | Name | Date |
|---|---|---|
| 1,507,651 | Young et al. | Sept. 9, 1924 |
| 1,521,619 | Haas | Jan. 6, 1925 |
| 1,940,157 | Tucker | Dec. 19, 1933 |
| 2,334,836 | Olsen | Nov. 23, 1943 |
| 2,394,203 | Pruder | Feb. 5, 1946 |

FOREIGN PATENTS

| Number | Country | Date |
|---|---|---|
| 37,990 | Switzerland | Sept. 8, 1906 |
| 120,340 | Australia | Sept. 3, 1945 |